US012710997B2

(12) United States Patent
Genchev et al.

(10) Patent No.: US 12,710,997 B2
(45) Date of Patent: Aug. 18, 2026

(54) RESOURCE ALLOCATION FOR CLOUD DEPLOYMENTS

(71) Applicant: VMware LLC, Palo Alto, CA (US)

(72) Inventors: Stoyan Genchev, Sofia (BG); Marin Dzhigarov, Sofia (BG); Ventsyslav Raikov, Sofia (BG)

(73) Assignee: VMware LLC, Palo Alto, CA (US)

( * ) Notice: Subject to any disclaimer, the term of this patent is extended or adjusted under 35 U.S.C. 154(b) by 521 days.

(21) Appl. No.: 18/330,162

(22) Filed: Jun. 6, 2023

(65) Prior Publication Data

US 2024/0411611 A1 Dec. 12, 2024

(51) Int. Cl.
*G06F 9/50* (2006.01)

(52) U.S. Cl.
CPC .......... *G06F 9/5077* (2013.01); *G06F 9/5072* (2013.01)

(58) Field of Classification Search
CPC ............................ G06F 9/5077; G06F 9/5072
See application file for complete search history.

(56) References Cited

U.S. PATENT DOCUMENTS

| | | | | |
|---|---|---|---|---|
| 11,425,054 | B1 * | 8/2022 | Dunsmore | H04L 47/828 |
| 11,778,053 | B1 * | 10/2023 | Allen | H04L 67/34 709/220 |
| 2023/0106025 | A1 * | 4/2023 | Genchev | G06F 9/5072 726/4 |
| 2024/0028415 | A1 * | 1/2024 | Wang | H04L 47/783 |
| 2024/0202044 | A1 * | 6/2024 | Madishetti | G06F 9/5072 |
| 2025/0294025 | A1 * | 9/2025 | Zhang | H04L 63/0281 |

* cited by examiner

*Primary Examiner* — Sisley N Kim
(74) *Attorney, Agent, or Firm* — Kim & Stewart LLP

(57) ABSTRACT

An example system obtains a request to deploy a cloud template, sorts a plurality of cloud zones in a list based on cost, the plurality of cloud zones being candidates to execute the cloud template, selects a first one of the cloud zones in the list based on the first one of the cloud zones corresponding to a first cost that is lower than second costs of other ones of the cloud zones in the list, and deploys the cloud template on one or more instances of the computing resources corresponding to the first one of the cloud zones.

20 Claims, 12 Drawing Sheets

RESOURCE ALLOCATION FOR CLOUD DEPLOYMENTS

FIELD OF THE DISCLOSURE

This disclosure relates generally to cloud computing and, more particularly, to resource allocation for cloud deployments.

BACKGROUND

Cloud environments are sometimes used to execute workloads. Such workloads can be executed using cloud applications. Cloud applications are a collection of computing resources that are coupled by a cloud network. Computing resources are virtual computer systems that are capable of providing computing services. Cloud networks allow cloud applications to create, read, update, and delete resources. Some resources include or are used to implement cloud applications.

Figure 1:
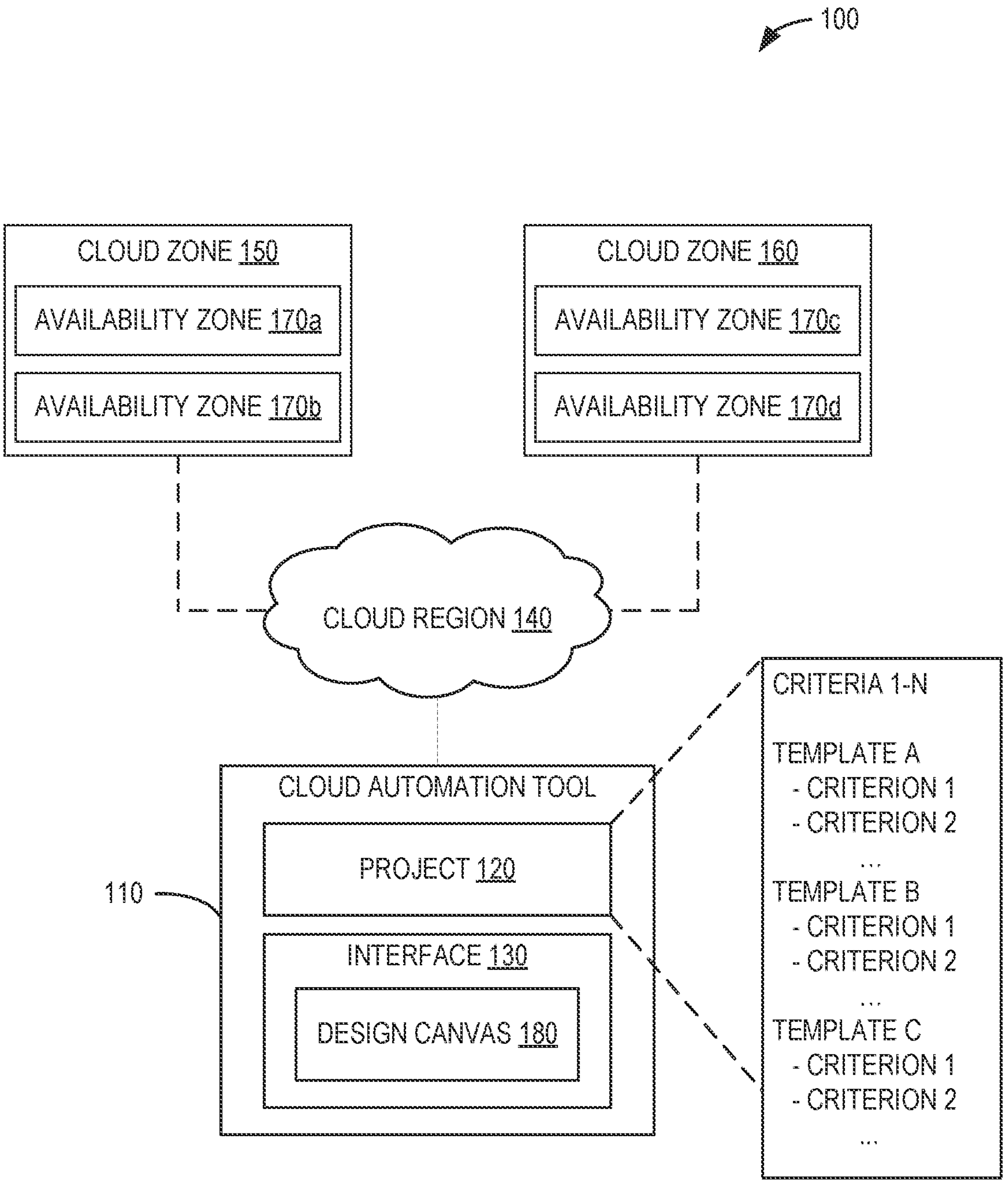
FIG. 1 is a block diagram of an example environment in which an example cloud automation tool operates to allocate resources for cloud deployments based on cost.

In general, the same reference numbers will be used throughout the drawing(s) and accompanying written description to refer to the same or like parts. The figures are not necessarily to scale. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

As cloud computing technologies advance, development of cloud services have become increasingly common. Sometimes, cloud computing utilizes computing resources that are capable of processing substantially more than what may be needed to implement cloud services. This excess of computing capabilities can improve scalability, management, and orchestration for a customer. However, with demands for cloud computing increasing, incentives for improving allocation of computing resources increase.

Cloud computing can be implemented based on a deployment of physical resources across a network, virtualizing the physical resources into virtual resources, and provisioning the virtual resources for use across cloud virtual machines, computing services, and/or applications. Cloud automation tools or services reduce creation and deployment complexity of virtual machines, computing services, and applications in a given cloud computing infrastructure. Some such cloud automation tools, such as VMware's vRealize Automation® (vRA) cloud assembly tool, automate the deployment, orchestration, governance, extensibility, and management of resources in a cloud infrastructure.

In some examples, a customer of the cloud automation tool can use resources provided by different cloud providers (e.g., Google Cloud Platform (GCP), Amazon Web Services (AWS), Microsoft Azure, etc.) for different deployments. Thus, the cloud automation tool can allow the customer to develop a "cloud agnostic" template to specify the topology of their desired deployments based on resources available across multiple different cloud providers and/or types of cloud services. As used herein, a "template" is an Infrastructure as Code (IaC) service provided by a cloud automation tool that a customer uses to specify the types of resources and VMs to deploy an infrastructure to handle one or more workloads (e.g., programs, applications, subroutines, etc.) of the template and the interconnections between such infrastructure. For example, a customer can design a template for an application that includes a WordPress® instance and a database, communicating through a private network, and a publicly accessible load balancer redirecting traffic to a server to serve incoming requests. The customer can use the cloud automation tool to deploy the template in one of many cloud regions, which are physical locations of a collection availability zones (e.g., data centers) owned and operated by cloud service providers with whom the customer has a cloud account. For example, a cloud region for GCP can be enumerated/identified as "GCP/europe-west-1," and availability zones within the "GCP/europe-west-1" region can be identified as "GCP/europe-west-1a," "GCP/europe-west-1b," "GCP/europe-west-1c," etc.

The customer can create a project using the cloud automation tool and develop one or more templates within the project. As used herein, a "project" refers to a collection of cloud templates and criteria defining where the cloud automation tool is to place workloads of a deployment. For example, criteria can include cloud zones, which identify resources of a particular cloud provider (e.g., cloud region) that are permitted to handle a deployment. As used herein, a "cloud zone" refers to a mapping between a cloud region and subset of availability zones within a cloud region, selected based on some strategy. A cloud zone maps to one or more availability zones within the cloud region. For example, a project can include a cloud zone that specifies the "GCP/europe-west-1a" availability zone as the deployment location for the template of the project. As used herein, a "flavor mapping" refers to criteria that define target deployment sizes for a specific cloud region, such as a "small" flavor mapping pointing to an instance type with 1 central processing unit (CPU) and 2 gigabytes (GB) of random access memory (RAM). As used herein, "to place" a cloud template at a resource or instance of a cloud zone means to install the cloud template (or an application of the template) at a resource of the cloud zone so the template (or application) can be executed at the selected cloud zone. As used herein, an "instance" refers to a server resource provided by third-party cloud service that can be managed by a customer for placement of a template or application. As used herein, "instance type" refers to a computational power and/or memory capacity of an instance. For example, a first instance type may correspond to a first server resource having 2 CPUs and 4 GB RAM, and a second instance type may correspond to a second server resource having 8 CPUs and 32 GB RAM.

The project of the cloud automation tool can specify multiple cloud zones, each associated with different availability zones. Thus, in some examples, the cloud automation tool uses a placement policy to determine the availability zone(s) where the template is to be deployed and the instances where application workloads are to be placed within the availability zone(s). In other words, the placement policy drives the cloud automation tool to select a cloud zone for deployment and/or a host (availability zone) for deployment associated with the cloud zone. The cloud automation tool can select one cloud zone for deployment from a plurality of cloud zones specified in the project based on the placement policy of the project.

In some examples, the placement policy can be set to "default," "binpack," "spread," "spread by memory," etc. In some examples, a default placement policy causes the cloud automation tool to distribute compute resources across clusters and host machines based on availability. That is, the machines in a particular deployment are provisioned on the first applicable host (e.g., instance of an availability zone). In other examples, a spread placement policy causes the cloud automation tool to provision compute resources, at a deployment level, to the cluster or host with the least number of virtual machines. Some prior cloud automation tools provision resources for deployments based on availability and efficient distribution. However, prior placement policies do not enable the example cloud automation tool to provision resources based on the cost of allocating such resources, even though in some instances cost is of primary importance to some customers.

Examples disclosed herein include methods and apparatus for cost-aware resource allocation for cloud deployments. Examples disclosed herein can deploy a template of a project at a cloud zone based on a cost-aware placement policy of the project and the allocation costs (e.g., hourly rates) of instances of the cloud zone. Furthermore, examples disclosed herein can place workloads of the template at resources (e.g., availability zones) within the cloud zone based on the costs of using the resources. That is, in accordance with examples disclosed herein, a cloud automation tool automates cloud deployment of cloud templates to a cloud zone and places portions (e.g., workloads, services, etc.) of the deployment at one or more availability zones of the cloud zone based on costs associated with instance types of the availability zone(s). In some examples, the customer can select the cost-aware placement policy prior to deployment of the template to cause examples disclosed herein to allocate resources associated with a relatively lower cost than other placement policies (e.g., default, spread, etc.) that the example cloud automation tool can implement.

Cloud computing is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing resources that are provided in SDDCs.

Examples disclosed herein may be used with one or more different types of virtualization environments. Three example types of virtualization environment are: full virtualization, paravirtualization, and operating system virtualization. Full virtualization, as used herein, is a virtualization environment in which hardware resources are managed by a hypervisor to provide virtual hardware resources to a virtual machine. In a full virtualization environment, the virtual machines do not have access to the underlying hardware resources. In a typical full virtualization, a host operating system with embedded hypervisor (e.g., a VMware ESXi® hypervisor) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or access to the hardware resources of the underlying server. Additionally, in full virtualization, a full guest operating system is typically installed in the virtual machine while a host operating system is installed on the server hardware. Example virtualization environments include VMware ESX® hypervisor, Microsoft Hyper-V® hypervisor, and Kernel Based Virtual Machine (KVM).

Paravirtualization, as used herein, is a virtualization environment in which hardware resources are managed by a hypervisor to provide virtual hardware resources to a virtual machine, and guest operating systems are also allowed to access some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Thus, a process executes within a container that isolates the process from other processes executing on the host operating system. Thus, operating system virtualization provides isolation and resource management capabilities without the resource overhead utilized by a full virtualization environment or a paravirtualization environment. Example operating system virtualization environments include Linux Containers LXC and LXD, the Docker™ container platform, the OpenVZ™ container platform, etc.

In some examples, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 is a block diagram of an example environment 100 in which an example cloud automation tool 110 operates to deploy cloud templates (e.g., applications) to multicloud infrastructures based on cost-aware resource allocation for such deployments. In the example of FIG. 1, the cloud environment 100 includes the example cloud automation tool 110, an example project 120, an example interface 130, an example cloud region 140, an example first cloud zone 150, an example second cloud zone 160, an example first availability zone 170*a*, an example second availability zone 170*b*, an example third availability zone 170*c*, and an example fourth availability zone 170*d*. The example cloud automation tool 110 can identify the cloud region 140 based on credentials of a customer account associated with the provider (e.g., GCP, AWS, Microsoft Azure, etc.) of the cloud region 140. Following a deployment request, the example cloud automation tool 110 can deploy a cloud application to the cloud region 140. The example cloud automation tool 110 can also perform deployment, orchestration, governance, extensibility, and management operations of cloud applications after deployment.

In the example of FIG. 1, the cloud automation tool 110 may be implemented using VMware's vRealize Automation® (vRA) cloud assembly tool. Alternatively, the cloud automation tool 110 may be implemented using any other cloud automation service and/or technology suite capable of deploying virtual machines, computing services, and/or applications of a given cloud infrastructure.

In the illustrated example of FIG. 1, the cloud automation tool 110 is communicatively coupled to the first, second, third, and/or fourth availability zones 170*a*, 170*b*, 170*c*, and/or 170*d* of the cloud region 140. In some examples, the availability zones 170*a*-170*d* are datacenters that provide cloud services and handle workloads of deployments. The example availability zones 170*a*-170*d* can include a plurality of instance types (server resources) on which the cloud automation tool 110 can deploy a cloud application. An instance type, for example, can be server(s) including 1 CPU and 2 GB RAM, 4 CPU and 8 GB RAM, 16 CPU and 94 GB RAM, etc.

In the illustrated example of FIG. 1, the cloud automation tool 110 of FIG. 1 can verify customer credentials associated with a provider of the cloud region 140 to group the first and second availability zones 170*a*, 170*b* into the first cloud zone 150. Additionally, the example cloud automation tool 110 can create the cloud zone based on criteria and capability tags specified in the cloud zone 150. For example, the criteria of the cloud zone 150 can cause the cloud automation tool 110 to include the availability zone(s) having certain instance types, memory limits, CPU limits, GPU limits, storage limits, and/or capability tags. As used herein, "capability tags" define characteristics such as location for a compute resource, adapter type for a network, tier level for a storage resource, and/or any other business considerations. The example cloud automation tool 110 can create many cloud zones for the project 120, and other projects can include the first and/or second cloud zone 150 and/or 160.

In the illustrated example of FIG. 1, the user or customer can develop a cloud application and design a cloud infrastructure for deployment using the interface 130. More specifically, the example interface 130 allows users to assemble the cloud infrastructure using an example design canvas 180. The example design canvas 180 is a graphical user interface (GUI) that visualizes the cloud deployments as a block diagram. The example design canvas 180 is a relatively high-level visual abstraction of the cloud deployment. For example, a cloud administrator may add a resource by dragging, dropping, and connecting a block to a cloud network diagram.

The example interface 130 of FIG. 1 also allows the customer to create, modify, and/or delete the project 120. More specifically, project administrator(s) set up the example project 120 and provide access to members who can use the project 120 to create and deploy cloud templates and/or cloud applications, deploy the applications, and/or define criteria for the project 120. For example, the project 120 includes an example plurality of criteria 1-N that affect the operations and deployments of an example first template A, an example second template B, and an example third template C. Furthermore, the example interface 130 allows administrators and/or members to define an example first criterion 1 and an example second criterion 2 for the first, second, and third templates A, B, and C. The example project 120 of FIG. 1 can include any number of applications, project criteria, and/or application criteria based on the capabilities of the cloud automation tool 110.

Figure 2:
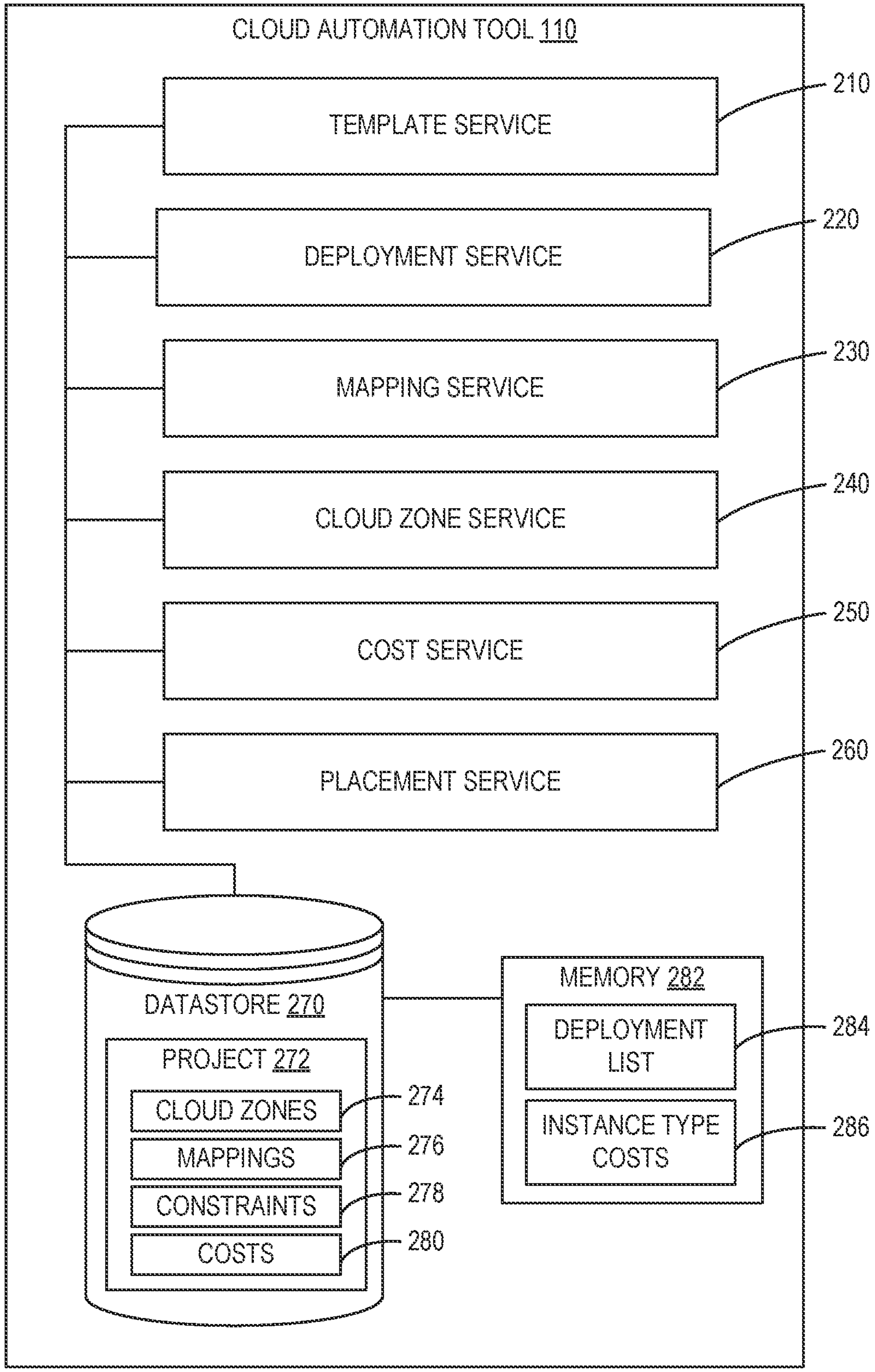
FIG. 2 is a block diagram of an example implementation of the cloud automation tool of FIG. 1.

FIG. 2 is a block diagram of an example implementation of the cloud automation tool 110 of FIG. 1 to allocate resources of a deployment based on the costs of cloud zones associated with the example project 120 of FIG. 1. The example cloud automation tool 110 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the example cloud automation tool 110 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the cloud automation tool 110 includes an example template service 210, an example deployment service 220, an example mapping service 230, an example cloud zone service 240, an example cost service 250, an example placement service 260, and an example datastore 270. The example datastore 270 of FIG. 2 stores data such as an example project 272 having example cloud zones 274, example mappings 276, example constraints 278, and example costs 280. Furthermore, the example cloud automation tool 110 includes an example memory 282 including an example deployment list 284, and example instance type costs 286.

The example cloud automation tool 110 of FIG. 2 includes the template service 210 to integrate the design canvas 180 of FIG. 1 with the cloud automation tool 110. The example template service 210 creates, deletes, and/or modifies resource instances and/or the mappings (e.g., flavor mappings and/or image mappings) of a template (e.g., template A of FIG. 1, etc.) based on changes to a schema of the template in the design canvas 180. For example, the template service 210 causes the mapping service 230 to create a flavor mapping for the template following a user adding one of the mappings 276 to the template. In such an example the flavor mapping can point to a certain instance type (e.g., 1 CPU and 2 GB RAM, etc.) that can be allocated for placement of template workloads. In another example, the template service 210 can cause the mapping service 230 to create an image mapping based on user input to the schema of the template in the design canvas 180 of FIG. 1. As used herein, "image mapping" refers to criteria that define a set of target operating system specifications for a specific cloud account/region in the cloud automation tool 110.

In some examples, the template service 210 can also define the constraints 278 of the project 272 based on user input. Such project constraints 278 can define limitations of the resources allocated for templates of the project 272. For example, the template service 210 can set the type of network resources or the amount of network bandwidth allocated to a deployment of a template. Additionally or alternatively, the example template service 210 can define a storage limitation and/or an extensibility limitation for deployments of the project 272. In some examples, the template service 210 is instantiated by programmable circuitry executing template service instructions and/or configured to perform operations such as those represented by the flowchart(s) of FIG. 5.

The example cloud automation tool 110 of FIG. 2 includes the deployment service 220 to deploy templates the template service 210 provides based on user input. More specifically, the deployment service 220 can create, store, and/or orchestrate deployments of templates on cloud resources. In some examples, the deployment service 220 initiates a placement process of the deployment. In some examples, the cloud automation tool 110 (e.g., the placement service 260, etc.) implements a cost-aware placement policy to allocate resources of the deployment based on the costs 280.

In some examples, the deployment service 220 manages deployments and the associated resources. In some examples, the deployment service 220 allows the user to troubleshoot failed provisioning processes, make changes to resources, and/or delete unused deployments. As mentioned above, deployments include deployed cloud templates and onboarded resources. In some examples, the deployment service 220 generates a diagram (e.g., topology) of a deployment including visual representations of the provisioned resources. The diagram can resemble the template created in the design canvas 180 of FIG. 1 using the template service 210 of the cloud application tool 110 (e.g., IaaS API) of FIG. 1. In some examples, the deployment service 220 is instantiated by programmable circuitry executing deployment service instructions and/or configured to perform operations such as those represented by the flowchart of FIG. 4.

The example cloud automation tool 110 of FIG. 2 includes the example mapping service 230 to map flavors and images of a template to a cloud deployment. That is, the example mapping service 230 defines flavor mappings and image mappings based on user input to a schema of a template or cloud application. Thus, the example mappings 276 of FIG. 2 can be specified for a particular template of the project 272, and the mapping service 230 maps the flavor and image to the deployment of the template. In some examples, the mappings 276 are associated with the cloud region, and the mapping service 230 maps the flavor and image of the region to the cloud deployments of the project 272.

In some examples, the mapping service 230 defines the flavor mapping as an indicator to a certain category of instances (e.g., a "small" category of instances including a range of 1 to 4 CPUs and 1 GB to 8 GB RAM sizes, etc.) that can be allocated for a deployment. Additionally, in some examples, the mapping service 230 defines the image mapping as an indicator to one or more operating systems or types of operating systems (e.g., UBUNTU®, etc.) of instances that can be allocated for a deployment. Upon initiating deployment of a template, the example mapping service 230 can load the mappings 276 (e.g., flavor mappings, image mappings, etc.) of the template from the datastore 270 to the memory 282. The example cloud zone service 240 can then use the mappings 276 to filter and sort the cloud zones 274 in the deployment list 284 to be selected for placement of the deployment. In some examples, the mapping service 230 is instantiated by programmable circuitry executing mapping service instructions and/or configured to perform operations such as those represented by the flowchart of FIG. 5.

The example cloud automation tool 110 of FIG. 2 includes the example cloud zone service 240 to create and manage cloud zones for a project (e.g., the cloud zones 274 of the project 272 of FIG. 2, the first and second cloud zones 150 and 160 of the project 120 of FIG. 1, etc.). In some examples, to create a cloud zone, the cloud zone service 240 validates credentials of a user cloud account for a cloud region. Thus, the example cloud zone is associated with a particular cloud region (e.g., the cloud region 140 of FIG. 1). The example placement service 260 can attempt to place workloads of a deployment to instances of a cloud region based on capability tags (e.g., characteristics) of the cloud zone set forth by the cloud zone service 240.

In some examples, the cloud zone service 240 populates cloud zone tags based on user inputs to create respective ones of the cloud zones 274 for the project 272. For example, the cloud zone service 240 can assign priority rankings to the cloud zones 274. Thus, upon deployment, the placement service 260 can initially attempt to place workloads of the deployment on the highest ranked one of the cloud zones 274. Other tags can specify limitations regarding the instances of the cloud region that can be allocated for the template following selection of the cloud zone for deployment. In some examples, the cloud zone service 240 limits the available number of instances that can be allocated for the deployment. Additionally or alternatively, the example cloud zone service 240 limits the memory size, number of CPUs, number of GPUs, and storage size of the instances that can be allocated for deployment. For example, the cloud zone service 240 can define the cloud zone as allowing deployment on up to 2 resource instances with each instance being limited to 8 GB of RAM, 2 CPUs, 1 GPU, and 100 GB of disk storage. In another example, the cloud zone service 240 can set the cloud zone tags as unlimited. Thus, the example cost service 250 can select a cloud zone based on the cost of resource allocation without having to consider particular performance or availability limitations.

Furthermore, after the example deployment service 210 obtains a request for deployment of a template, the example cloud zone service 240 can filter and sort the cloud zones 274 of the project 272 based on the mappings 276 and the constraints 278. In some examples, when the deployment service 220 obtains a request to deploy a cloud template, the cloud zone service 240 loads the cloud zones 274 associated with the project 272 into the memory 282. Furthermore, the example cloud zone service 240 generates the deployment list 284, which initially includes the cloud zones 274 of the project 272. The example cloud zone service 240 can then sort and filter the deployment list 284 based on ones of the mappings 276 associated with the template. For example, the cloud zone service 240 can arrange the cloud zones 274 in the deployment list 284 in ascending order based on priority rankings. The example cloud zone service 240 can also remove ones of the cloud zones 274 from the deployment list 284 that have cloud zone tags that are not compatible with the mappings 276. For example, when the cloud zone service 240 limits a CPU count of a first cloud zone to 2 CPUs per instance, and the mapping service 230 limits a flavor mapping of the template to an allocation of instances having 16 CPUs, then the cloud zone service 240 removes the first cloud zone from the deployment list 284. Furthermore, the example cloud zone service 240 can sort and filter the deployment list 284 based on the constraints 278 of the project 272. For example, when the cloud zone service 240 limits a storage size of a second cloud zone to 10 GB per deployment, and the template service 210 limits a storage size of the project 272 to 50 GB per deployment, then the cloud zone service 240 removes the second cloud zone from the deployment list 284. In some examples, the cloud zone service 240 is instantiated by programmable circuitry executing cloud zone service instructions and/or configured to perform operations such as those represented by the flowchart of FIG. 5.

The example cloud automation tool 110 of FIG. 2 includes the example cost service 250 to sort a plurality of cloud zones (e.g., the cloud zones 274, etc.) based on cost. Additionally, the example cost service 250 identifies a first cloud zone of the plurality of cloud zones associated with a lowest cost. More specifically, after the cloud zone service 240 sorts and filters the deployment list 284, the example cost service 250 sorts the cloud zones of the deployment list 284 based on the instance type costs 286 (e.g., hourly rates, etc.) associated with the cloud zones 274. The example cost service 250 can then identify a first one of the cloud zones 274 in the deployment list 284 based on the first one of the cloud zones 274 corresponding to a first cost that is lower than second costs of other ones of the cloud zones 274 in the deployment list 284.

In the illustrated example of FIG. 2, the cost service 250 fetches costs of instance types from associated cloud providers. In some examples, the costs are hourly rates. In some examples, the instance types are specifications corresponding to the compute resources (e.g., number of CPUs, size of RAM, etc.) of the server instances. Thus, the instance types available in a cloud zone can correspond to the flavor mapping of the template and/or the capability tags of the cloud zone. Additional details regarding how the example cost service 250 obtains the instance type costs are described in connection with FIG. 3.

In some examples, when the deployment service 220 obtains a request to deploy a template of the project 272, the cost service 250 stores the instance type costs 286 in the memory 282 based on the template and the project 272. More specifically, the example cost service 250 detects the instance types specified by the flavor mapping of the template and detects the cloud providers of the cloud zones 274. The example cost service 250 can then search for the instance type costs 286 in the datastore 270 based on the instance types and cloud providers and load the instance type costs 286 into the memory 282. Thus, the example instance type costs 286 can be hourly rates corresponding to instance types associated with the flavor mapping of the template and the cloud providers of the cloud zones 274. Alternatively, the example instance type costs 286 can be associated with the cloud providers of a portion of the cloud zones 274.

Furthermore, after the example cloud zone service 240 sorts and/or filters the deployment list 284, the example cost service 250 sorts the cloud zone of the deployment list 284 based on the instance type costs 286. In some examples, the cost service 250 detects the cloud regions/providers of the cloud zones in the deployment list 284. Furthermore, the example cost service 250 can query the datastore 270 to determine the instance types of the cloud regions to use for deployment based on the flavor mappings of the template. The example cost service 250 can then determine which ones of the cloud zones in the deployment list correspond to respective ones of the instance costs 286. In some examples, the cost service 250 sorts the deployment list 284 in ascending order based on the instance type costs 286. As such, the example cost service 250 orders the cloud zone associated with the lowest-costed instance type to the highest-ranked position of the deployment list 284. In some examples, the cost service 250 is instantiated by programmable circuitry executing cost service instructions and/or configured to perform operations such as those represented by the flowcharts of FIGS. 4-8.

The example cloud automation tool 110 of FIG. 2 includes the example placement service 260 to deploy the cloud template at the cloud zone associated with the lowest cost. More specifically, the example placement service 260 selects the highest-ordered cloud zone from the deployment list 284 after the cost service 250 sorts the cloud zones based on cost. In some examples, the placement service 260 sends a placement request to an availability zone (e.g., the first availability zone 170*a* of FIG. 1, etc.) of the selected cloud zone (e.g., the first cloud zone 150 of FIG. 1, etc.). In some examples, the placement service 260 sends multiple placement requests to multiple availability zones of the selected cloud zone to distribute workloads of the cloud template across a plurality of resources.

In some examples, the placement service 260 selects the availability zone based on the resource availability of a host and/or cluster of hosts in the availability zone. The example placement service 260 can select an availability zone based on the constraints 278 of the project 272. For example, the placement service 260 can filter out availability zones of the selected cloud zone based on the available instance types at the hosts, the available datastore capacity of the host, and/or the type of virtual network of the cluster. In some examples, the placement service 260 is instantiated by programmable circuitry executing placement service instructions and/or configured to perform operations such as those represented by the flowcharts of FIGS. 4-8.

Figure 3:
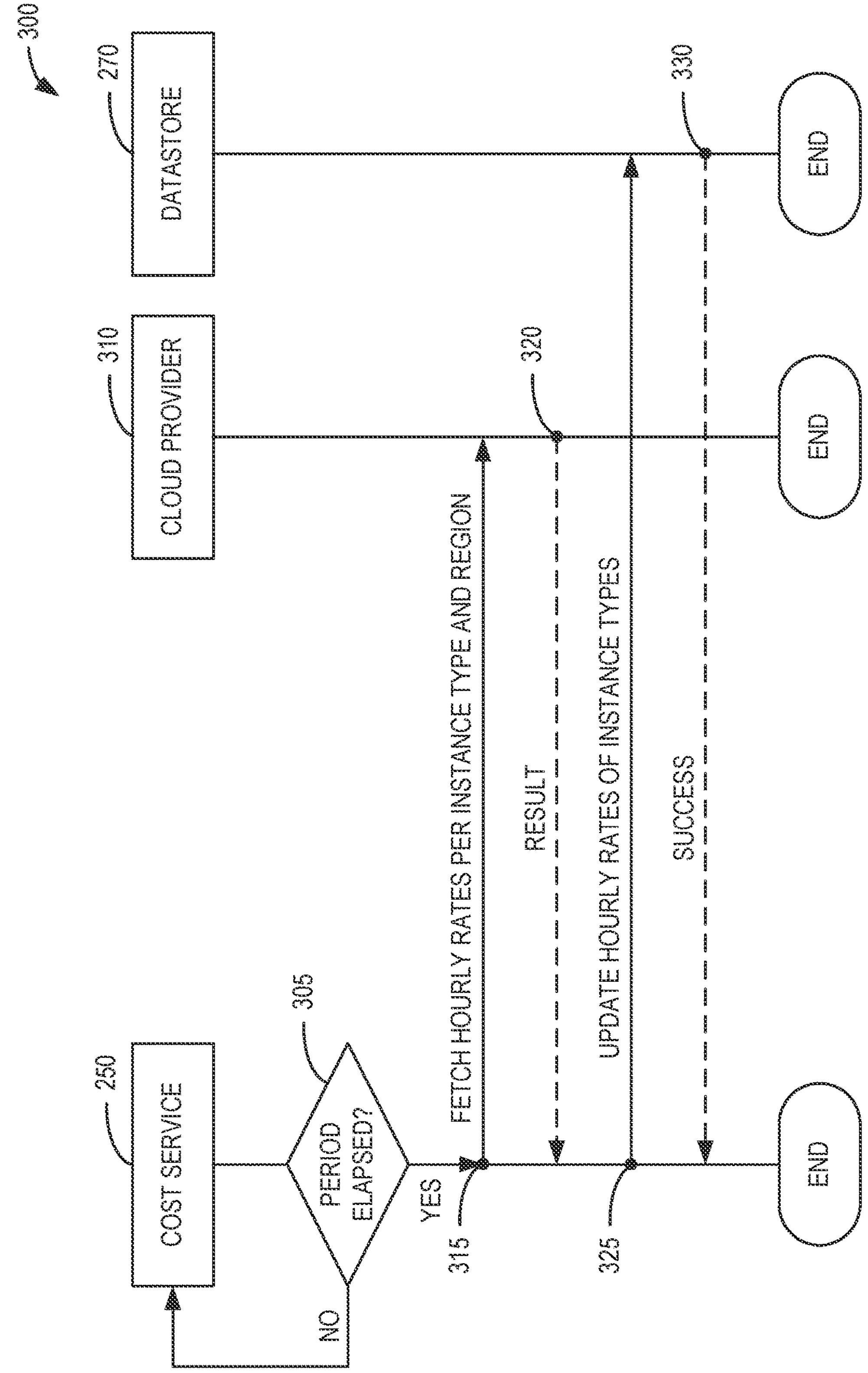
FIG. 3 is a timing diagram of example operations to fetch costs of resource instances for the cloud automation tool of FIGS. 1 and 2.

FIG. 3 is a timing diagram of example operations 300 to fetch costs of resource instances for the cloud automation tool 110 of FIGS. 1 and 2. The example operations 300 begin at block 305 at which the cost service 250 determines whether a time period (e.g., 30 seconds, one hour, one day, etc.) has elapsed. The example time period can be based on how frequently cloud providers 310 update hourly rates of allocating resource instances for cloud deployments. The example cost service 250 can reference or query a timer, a counter, and/or a processor clock to determine whether the time period has elapsed.

When the cost service 250 determines that the time period has elapsed, the example operations 300 proceed to a first time 315 at which the cost service 250 fetches hourly rates per instance type and region from cloud providers 310. In some examples, the cost service 250 sends a request to the cloud providers 310 to transmit the hourly rates to the cloud automation tool 110. At a second time 320, the example cost service 250 obtains the hourly rates (e.g., including the costs 280 of FIG. 2) corresponding to instance types of cloud regions on which the cloud automation tool 110 can deploy cloud templates. At a third time 325, the example cost service 250 updates the hourly rates in the datastore 270 of FIG. 2. At a fourth time 330, after the hourly rates associated with each instance type and cloud region have updated, the example datastore 270 provides a message to the cost service 250 that the data has been successfully updated. After the fourth time 330, the operations 300 end.

In some examples, the cloud automation tool 110 of FIGS. 1 and 2 includes means for obtaining a deployment request for a cloud application template. For example, the means for obtaining a deployment request may be implemented by the deployment service 220. In some examples, the deployment service 220 may be instantiated by programmable circuitry such as the example programmable circuitry 912 of FIG. 9. For instance, the example deployment service 220 may be instantiated by the example microprocessor 1000 of FIG. 10 executing machine executable instructions such as those implemented by at least block 402 of FIG. 4. In some examples, the deployment service 220 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the example deployment service 220 may be instantiated by any other combination of hardware, software, and/or firmware. For example, the deployment service 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the cloud automation tool 110 of FIGS. 1 and 2 includes means for mapping instance types and operating system preferences of a cloud application template to a deployment. For example, the means for mapping may be implemented by the mapping service 230. In some examples, the mapping service 230 may be instantiated by programmable circuitry such as the example programmable circuitry 912 of FIG. 9. For instance, the example mapping service 230 may be instantiated by the example microprocessor 1000 of FIG. 10 executing machine executable instructions such as those implemented by at least block 504 of FIG. 5. In some examples, the mapping service 230 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the example mapping service 230 may be instantiated by any other combination of hardware, software, and/or firmware. For example, the mapping service 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the cloud automation tool 110 of FIGS. 1 and 2 includes means for managing cloud zones of a cloud project. For example, the means for managing cloud zones may be implemented by the cloud zone service 240. In some examples, the cloud zone service 240 may be instantiated by programmable circuitry such as the example programmable circuitry 912 of FIG. 9. For instance, the example cloud zone service 240 may be instantiated by the example microprocessor 1000 of FIG. 10 executing machine executable instructions such as those implemented by at least block 502, 508, and 510 of FIG. 5. In some examples, the cloud zone service 240 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the example cloud zone service 240 may be instantiated by any other combination of hardware, software, and/or firmware. For example, the cloud zone service 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the cloud automation tool 110 of FIGS. 1 and 2 includes means for determining a cloud zone of a plurality of cloud zones associated with a lowest cost. For example, the means for determining may be implemented by the cost service 250. In some examples, the cost service 250 may be instantiated by programmable circuitry such as the example programmable circuitry 912 of FIG. 9. For instance, the example cost service 250 may be instantiated by the example microprocessor 1000 of FIG. 10 executing machine executable instructions such as those implemented by at least block 404 and 406 of FIGS. 4, 506, 512, and 514 of FIG. 5, and 602-608 of FIG. 6. In some examples, the cost service 250 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the example cost service 250 may be instantiated by any other combination of hardware, software, and/or firmware. For example, the cost service 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the cloud automation tool 110 of FIGS. 1 and 2 includes means for deploying (or placing) workloads of a cloud application to resources of a cloud region. For example, the means for deploying may be implemented by the placement service 260. In some examples, the placement service 260 may be instantiated by programmable circuitry such as the example programmable circuitry 912 of FIG. 9. For instance, the example placement service 260 may be instantiated by the example microprocessor 1000 of FIG. 10 executing machine executable instructions such as those implemented by at least block 408 of FIG. 4 and 516-530 of FIG. 5. In some examples, the placement service 260 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the example placement service 260 may be instantiated by any other combination of hardware, software, and/or firmware. For example, the placement service 260 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the cloud automation tool 110 of FIG. 1 is illustrated in FIG. 2, one or more of the elements, processes, and/or devices illustrated in FIG. 2 may be combined, divided, re-arranged, omitted, eliminated, and/or implemented in any other way. Further, the example template service 210, the example deployment service 220, the example mapping service 230, the example cloud zone service 240, the example cost service 250, the example placement service 260, and/or, more generally, the example cloud automation tool 110 of FIG. 2, may be implemented by hardware alone or by hardware in combination with software and/or firmware. Thus, for example, any of the example template service 210, the example deployment service 220, the example mapping service 230, the example cloud zone service 240, the example cost service 250, the example placement service 260, and/or, more generally, the example cloud automation tool 110, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example cloud automation tool 110 of FIG. 2 may include one or more elements, processes, and/or devices in addition to, or instead of, those illustrated in FIG. 2, and/or may include more than one of any or all of the illustrated elements, processes and devices.

Flowchart(s) representative of example machine readable instructions, which may be executed by programmable circuitry to implement and/or instantiate the cloud automation tool 110 of FIG. 2 and/or representative of example operations which may be performed by programmable circuitry to implement and/or instantiate the cloud automation tool 110 of FIG. 2, are shown in FIGS. 4-8. The machine readable instructions may be one or more executable programs or portion(s) of one or more executable programs for execution by programmable circuitry such as the processor circuitry 912 shown in the example processor platform 900 discussed below in connection with FIG. 9 and/or may be one or more function(s) or portion(s) of functions to be performed by the example programmable circuitry (e.g., an FPGA) discussed below in connection with FIGS. 10 and/or 11. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 4-8, many other methods of implementing the example cloud automation tool 110 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-8 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
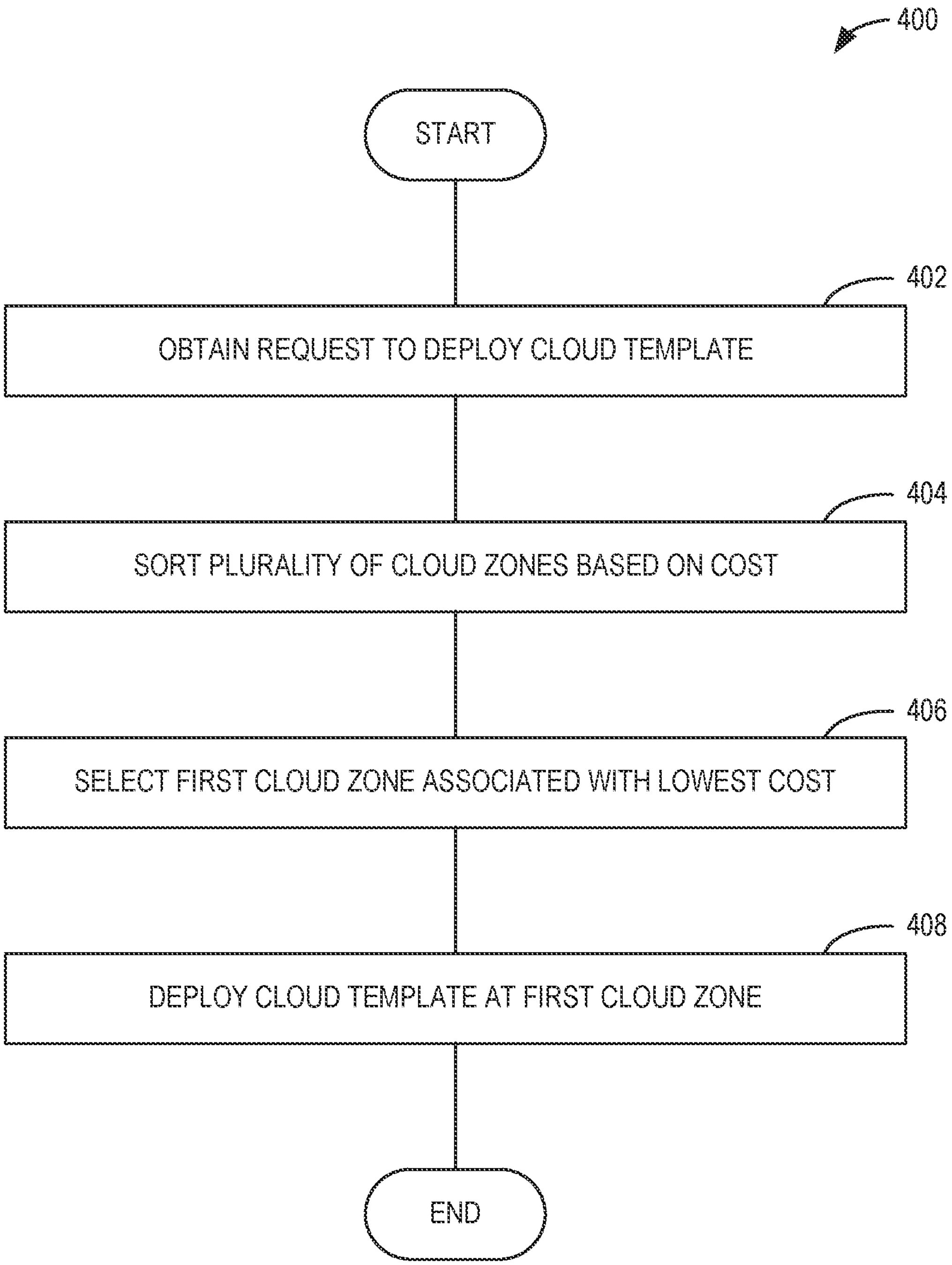
FIG. 4 is a flowchart representative of example machine readable instructions and/or example operations that may be executed, instantiated, and/or performed by example programmable circuitry to implement the cloud automation tool of FIG. 2 to allocate resources for cloud deployments based on cost.

FIG. 4 is a flowchart representative of example machine readable instructions and/or example operations 400 that may be executed, instantiated, and/or performed by programmable circuitry to allocate resources of a cloud network for a cloud deployment based on costs (e.g., hourly rates) of utilizing the resources. The example machine-readable instructions and/or the example operations 400 of FIG. 4 begin at block 402, at which the example deployment service 220 (FIG. 2) obtains a request to deploy a cloud template. In some examples, the request is initiated from a user input to the interface 130 of the cloud automation tool 110 of FIG. 1. For example, the user can create a cloud template in the design canvas 180 (FIG. 1) of the interface 130 to define how resources of the associated deployment are to be distributed in a virtual network.

At block 404, the example cost service 250 (FIG. 2) sorts a plurality of cloud zones based on cost. In some examples, the cost service 250 arranges cloud zones in the deployment list 284 of FIG. 2 based on cost in ascending order such that the highest ordered cloud zone is associated with the lowest cost. In some examples, respective ones of the cloud zones in the deployment list 284 are associated with an instance type that matches a flavor mapping of the cloud template. Thus, the cost of a cloud zone can pertain to cost per hour of allocating an instance within the cloud zone where a workload of the cloud template can be deployed (or placed).

At block 406, the example cost service 250 selects a first cloud zone associated with a lowest cost. In some examples, the cost service 250 determines which one of the cloud zones in the deployment list 284 is of the highest order. At block 408, the example placement service 260 (FIG. 2) deploys the cloud template at the first cloud zone. In some examples, the placement service 260 determines one or more availability zones of the cloud zone at which one or more applications and/or workloads are to be placed/deployed. The example operations 400 end.

Figure 5:
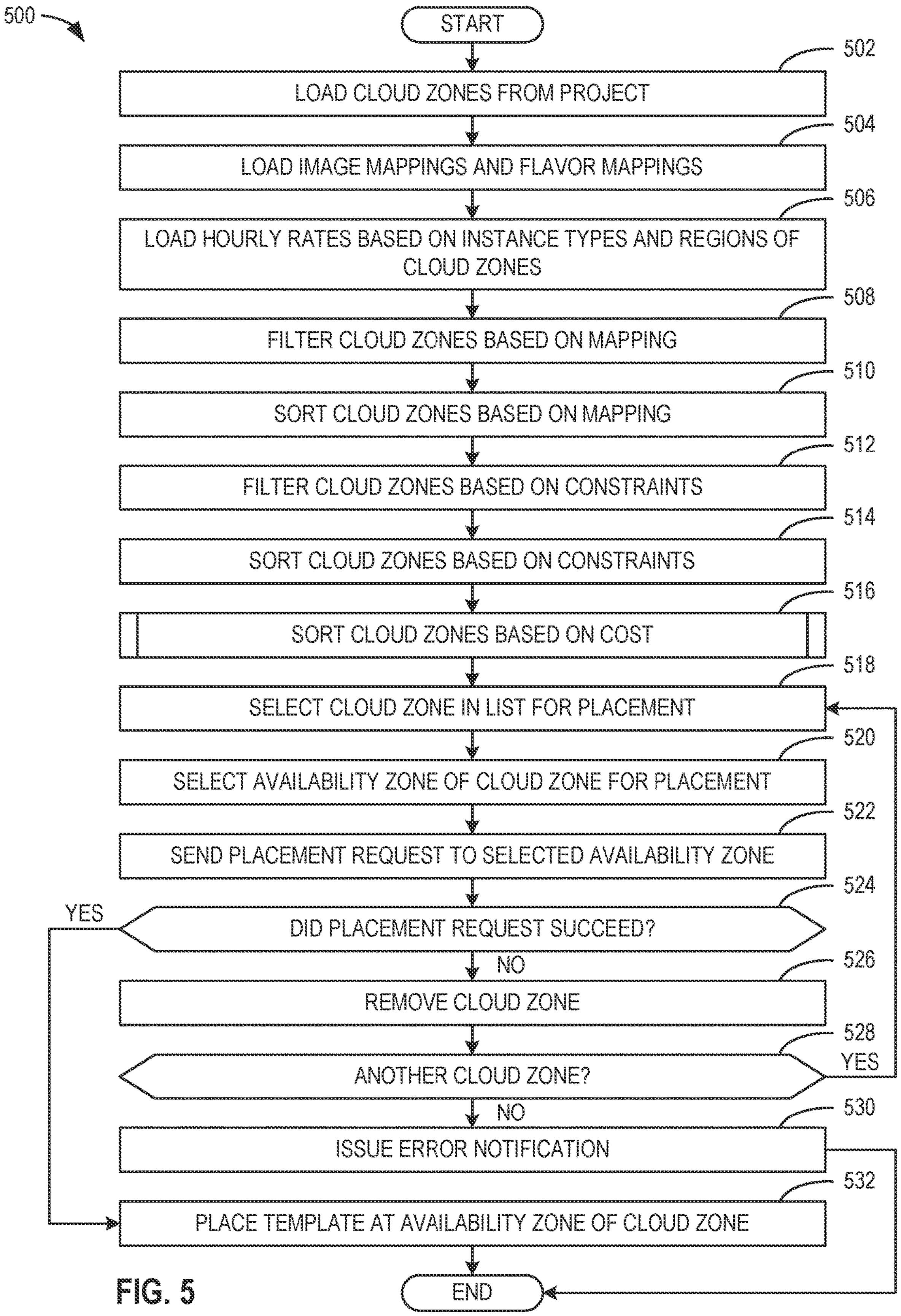
FIGS. 5-8 are flowcharts representative of example machine readable instructions and/or example operations that may be executed, instantiated, and/or performed by example programmable circuitry to implement the cloud automation tool of FIG. 2 to deploy a cloud template based on cost.

FIG. 5 is a flowchart representative of example machine readable instructions and/or example operations 500 that may be executed, instantiated, and/or performed by programmable circuitry to allocate resources of a cloud network for a cloud deployment based on costs (e.g., hourly rates) of utilizing the resources. In some examples, the machine-readable instructions and/or the example operations 500 of FIG. 5 begin after the example deployment service 220 (FIG. 2) detects a deployment request for a cloud template (e.g., the request of block 402 of FIG. 4 to deploy a cloud template). The example machine-readable instructions and/or the example operations 500 of FIG. 5 begin at block 502, at which the example cloud zone service 240 (FIG. 2) loads the cloud zones 274 of FIG. 2 from the project 272. For example, the cloud zone service 240 loads the cloud zones 274 from the project 272 in the datastore 270 to the deployment list 284 in the memory 282 of FIG. 2. In some examples, the cloud zone service 240 creates the cloud zones 274 based on user account credentials associated with a cloud region and the capability tags of the cloud zones as defined by the user. Thus, the example cloud zone service 240 loads cloud zones into the deployment list 284 of the memory 282 that may or may not include resources or instances that are compatible with the deployment of the template.

At block 504, the example mapping service 230 (FIG. 2) loads the image mappings and the flavor mappings of the template into the memory 282. In some examples, the image and flavor mappings of the template are included in the mappings 276 of FIG. 2, which are the flavor and image mappings of the templates in the project 272.

At block 506, the example cost service 250 loads hourly rates based on instance types and regions of the cloud zones. For example, the cloud zone service 250 can populate the deployment list 284 (FIG. 2) with hourly rates and corresponding instance types and regions of the cloud zones. In some examples, the cost service 250 queries the memory 282 for the regions/providers associated with the cloud zones in the deployment list 284 and the instance types associated with the flavor mappings of the template. The example cost service 250 can then query the datastore 270 for the hourly rates corresponding to the instances of the cloud zones where the template can be deployed.

At block 508, the example cloud zone service 240 filters the cloud zones in the deployment list 284 based on the flavor mappings and the image mappings of the template. In some examples, the cloud zones of the deployment list 284 include tags that limit the types of instances that can be allocated for deployment. The example cloud zone service 240 can determine whether the tags of the cloud zones match the flavor and/or image mappings of the template and filter out the cloud zones with tags that are outside of the bounds of the mappings.

At block 510, the example cloud zone service 240 sorts the cloud zones in the deployment list 284 based on the flavor mappings and the image mappings of the template. In some examples, the cloud zones include capability tags that can specify the types of operating systems of the instances within the cloud zones. The example cloud zone service 240 can determine how closely the capability tags match the image mappings and sort the deployment list 284 such that the cloud zones with capability tags closest to the image mapping are arranged in a higher order or rank.

At block 512, the example cloud zone service 240 filters the cloud zones based on tags. In some examples, the cloud zone service 240 compares the tags of the cloud zones in the deployment list 284 to the constraints 278 of the project 272. The example cloud zone service 240 removes cloud zones with tags that are outside of the limitations of the constraints 278 of the project 272. At block 514, the example cloud zone service 240 sorts the cloud zones based on tags. In some examples, the cloud zone service 240 moves cloud zones that have tags that closely match the constraints 278 (e.g., exactly match, match within a specified error threshold, etc.) to a higher order in the deployment list 284.

At block 516, the example cost service 250 sorts the cloud zones in the deployment list 284 based on the costs of the cloud zones. In some examples, the costs of the cloud zones correspond to hourly rates of allocating instances of the cloud zones that match the flavor mapping of the template. Further details on the operations of block 516 are described below in connection with FIG. 6.

At block 518, the example cost service 250 selects a cloud zone in the deployment list 284 for placement of the deployment. In some examples, the cost service 250 selects the highest ordered cloud zone in the deployment list 284, which is associated with the lowest cost. In some examples, when placement of the deployment is unsuccessful at instances of the highest ordered cloud zone, the cost service 250 can select the next highest ordered cloud zone of the deployment list 284.

At block 520, the example placement service 260 (FIG. 2) selects an availability zone of the selected cloud zone for placement. In some examples, the placement service 260 selects the availability zone based on an alphabetical and/or numerical order of availability zones associated with the cloud zone. In some examples, the placement service 260 filters the availability zones of the cloud zone based on the constraints 278 of the project 272, the flavor and/or image mappings of the template, the datastore capacities of the availability zones associated with the cloud zone, etc.

At block 522, the example placement service 260 sends a placement request to the selected availability zone. In some examples, the placement request causes a server of the availability zone to schedule placement of the deployment in the selected availability zone. At block 524, the example placement service 260 determines whether the placement request succeeded. In some examples, the placement service 260 checks example interface circuitry (e.g., network interface controller, etc.) to determine whether a response was received from the availability zone indicating that the resource was successfully deployed. When the placement service 260 determines that the placement was not successful, the example operations 500 proceed to block 526. When the placement service 260 determines that the placement was successful, the example operations 500 proceed to block 532, at which the example placement service 260 places the template and/or a workload of the template at the availability zone of the cloud zone. Afterwards, the example operations 500 end.

At block 526, the example placement service 260 removes the selected cloud zone. In some examples, the placement service 260 removes the cloud zone from the memory 282 such that the highest ordered cloud zone of the deployment list 284 is updated. That is, in some examples, the second highest ordered cloud zone becomes the first highest ordered cloud zone after the operations of block 524.

At block 528, the example placement service 260 determines whether there is another cloud zone in the deployment list at which the deployment can be placed. In some examples, the placement service 260 queries the memory 282 to provide the highest ordered cloud zone in the deployment list to determine whether another cloud zone is available after the previously selected cloud zone was removed. When another cloud zone is available for placement, control returns to block 518. When another cloud zone is not available for placement, the example operations proceed to block 530 at which the placement service 260 issues an error notification that the deployment was unsuccessful. In some examples, the error notification is issued to the user via the interface 130 of FIG. 1. In some examples, the cloud zone service 240 can generate a new cloud zone based on the flavor mapping of the template and with unlimited tags to increase the chances of a successful placement upon redeployment of the template. After block 530, the example operations 500 end.

Figure 6:
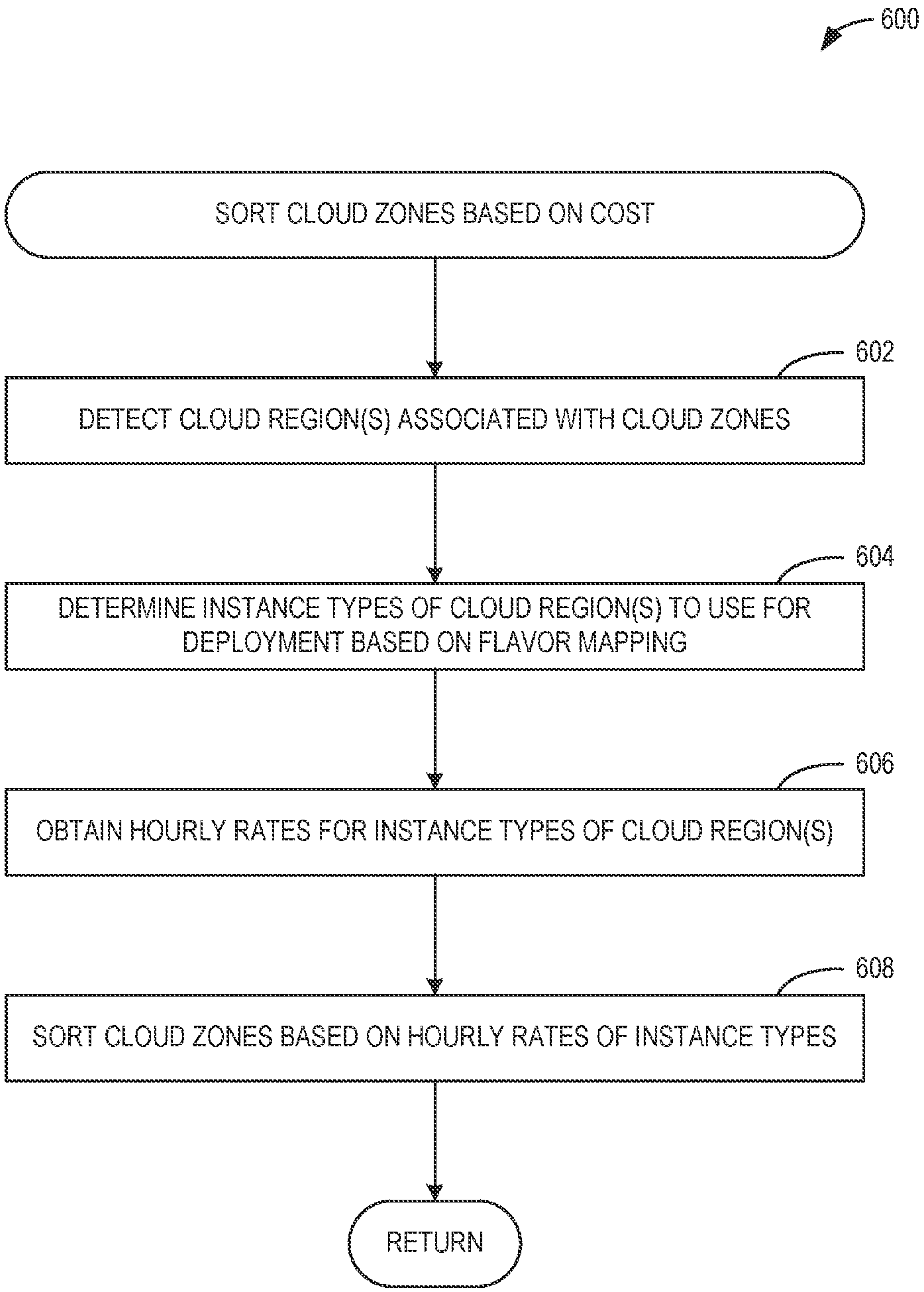

FIG. 6 is a flowchart representative of example machine readable instructions and/or example operations 600 that may be executed, instantiated, and/or performed by programmable circuitry to sort cloud zones associated with a cloud template based on cost. The cost of a cloud zone corresponds to the cloud region of the cloud zone and the instance type that matches the flavor mapping of the cloud template. The example instructions and/or operations 600 of FIG. 6 may be used to implement block 516 described above in connection with FIG. 5. The example machine-readable instructions and/or the example operations 600 of FIG. 6 begin at block 602, at which the example cost service 250 (FIG. 2) detects the cloud region(s) associated with the cloud zones of the deployment list 284 of FIG. 2. In some examples, the cloud zones are associated with the same cloud region. Alternatively, first ones of the cloud zones can be associated with a first cloud region, and second ones of the cloud zones can be associated with a second cloud region.

At block 604, the example cost service 250 determines the instance types of the cloud region(s) to use for deployment based on the flavor mapping of the template. The example cost service 250 can query the datastore 270 and/or the memory 282 of FIG. 2 to obtain the flavor mapping that defines the instance type to be used for deployment. In some examples, the flavor mapping is a specific instance type, such as 2 CPUs and 8 GB RAM. In other examples, the flavor mapping is a range of instance type specifications such as 1-3 CPUs and 4-16 GB RAM. As described above in connection with block 508 of FIG. 5, the example the cloud zone service 240 (FIG. 2) filters the cloud zones in the deployment list 284 based on the flavor mapping of the template. Thus, the cloud zones of the deployment list 284 include instances of the cloud regions that are compatible with the flavor mapping.

At block 606, the example cost service 250 obtains the hourly rates of the instance types of the cloud region(s). The example cloud service 250 can search the datastore 270 and/or the memory 282 for stored and/or loaded costs of instance types per cloud region. In some examples, the cost service 250 uses the detected cloud region(s) and the determined instance types as search parameters to form a query for the corresponding hourly rates. In some examples, searching for the hourly rates includes refreshing the hourly rates to ensure the cost data is updated and accurate.

At block 608, the example cost service 250 sorts the cloud zones based on hourly rates of instance types. In some examples, the cost service 250 sorts the cloud zones in the deployment list 284 in ascending order. Thus, the cloud zones with the lowest cost are ordered highest in the deployment list 284. After block 610 is completed, control returns to block 518 of FIG. 5.

Figure 7:
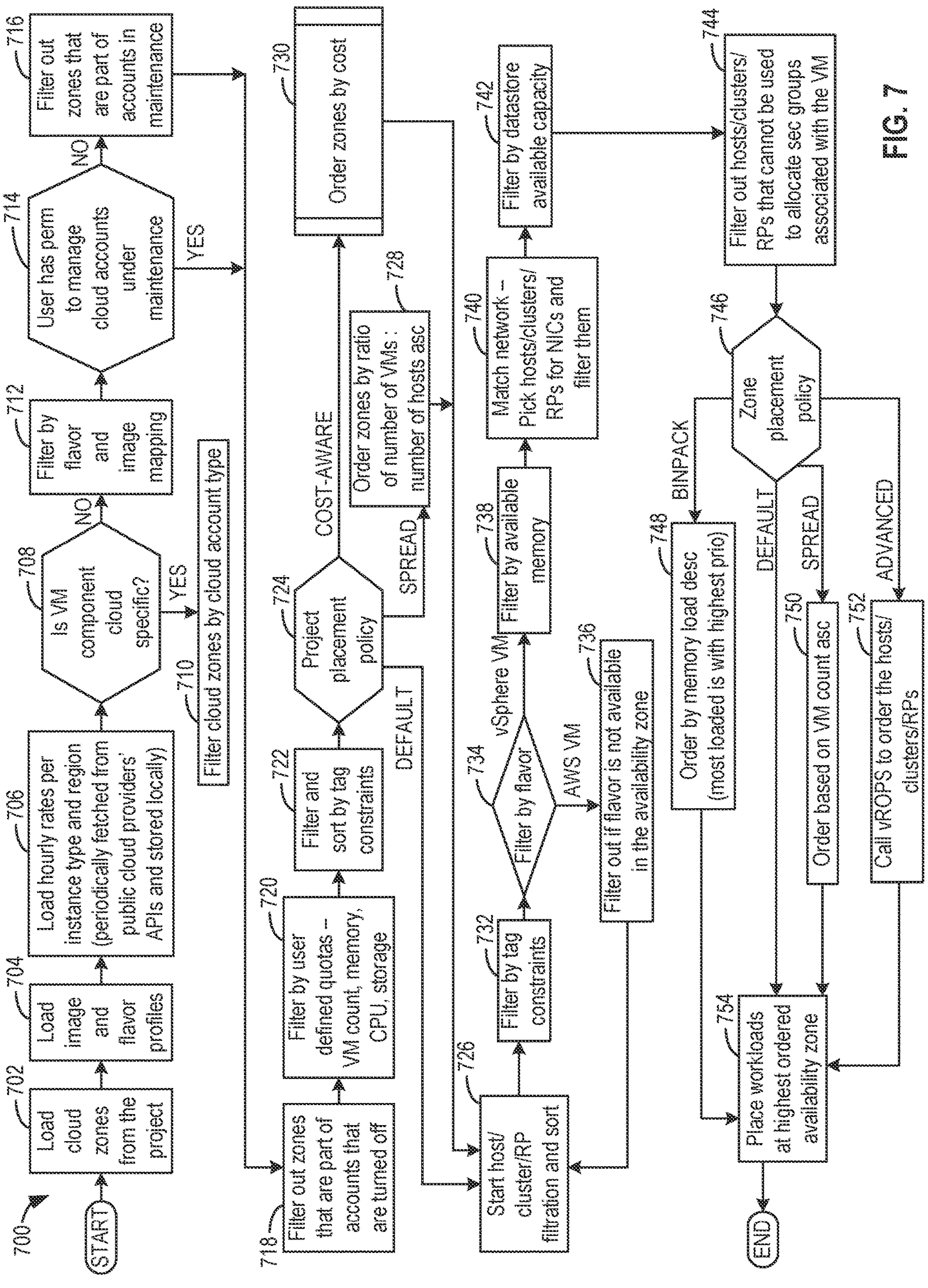

FIG. 7 is a flowchart representative of example machine readable instructions and/or example operations 700 that may be executed, instantiated, and/or performed by programmable circuitry to allocate resources of a cloud network for a cloud deployment based on costs (e.g., hourly rates) of instance types associated with the deployment. In some examples, the machine-readable instructions and/or the example operations 700 of FIG. 7 begin after the example deployment service 220 (FIG. 2) detects a deployment request for a cloud template (e.g., the request of block 402 of FIG. 4 to deploy a cloud template). The example machine-readable instructions and/or the example operations 700 of FIG. 7 begin at block 702, at which the example cloud zone service 240 (FIG. 2) loads the cloud zones 274 of FIG. 2 from the project 272. The example mapping service 230 (FIG. 2) loads image and flavor profiles at block 704. The image and flavor profiles can correspond to the image mappings and/or flavor mappings of the cloud regions associated with the loaded cloud zones.

At block 706, the example cost service 250 (FIG. 2) loads hourly rates per instance type and region. In some examples, the hourly rates are periodically fetched from public cloud providers' APIs and stored locally (e.g., in the memory 282 of FIG. 2). At block 708, the example cloud zone service 240 determines whether a virtual machine (VM) component (e.g., CPU, network, memory, etc.) is cloud region specific. At block 710, when the VM component is cloud region specific, the example cloud zone service 240 filters the cloud zones by cloud account type.

At block 712, the example cloud zone service 240 filters the cloud zones based on the flavor and image mappings of the project and/or deployment template. At block 714, the example cloud zone service 240 determines whether the user and/or customer has permission to manage cloud accounts that are under maintenance. When the user does not have such permissions or access, control proceeds to block 716 at which the cloud zone service 240 filters out cloud zones associated with cloud accounts in maintenance. At block 718, the cloud zone service 240 filters out cloud zones associated with cloud accounts that are deactivated. At block 720, the cloud zone service 240 filters the cloud zones based on user defined quotas such as VM count, memory, CPU, storage, etc. The example cloud zone service 240 filters and sorts the remaining cloud zones based on tag constraints of the cloud zones at block 722.

At block 724, the example placement service 260 (FIG. 2) detects which placement policy the user has selected for the deployment and/or the project. When the placement service 260 determines the placement policy corresponds to a default policy, control proceeds to block 726. At block 726, the example placement service 260 selects a first (e.g., highest ordered) cloud zone in the deployment list 284 of FIG. 2 and begins a filtration and sorting process of availability zones in the first cloud zone. Respective ones of the example availability zones include a host, cluster, and/or resource pool of the first cloud zone. When the placement service 260 determines the placement policy corresponds to a spread policy at block 724, control proceeds to block 728 at which the example cloud zone service 240 orders the cloud zones in the deployment list 284 in ascending order based on a ratio of number of VMs available at the cloud zones to a number of host servers in the cloud zone. When the placement service 260 determines the placement policy corresponds to a cost-aware policy at block 724, control proceeds to block 730 at which the example cloud zone service 240 orders the cloud zones based on cost. Further descriptions of the process associated with block 730 are provided below in connection with FIG. 8. Following completion of block 728 or block 730, control proceeds to block 726.

At block 732, the example placement service 260 filters the availability zones based on tag constraints of the first cloud zone and/or the project. At block 734, the example placement policy 260 determines whether the flavor mapping of the cloud template, the project, and/or the cloud zone corresponds to an Amazon Web Service® (AWS) VM, a vSphere® VM, or a VM of another cloud provider. When the flavor mapping specifies an AWS VM, control proceeds to block 736 at which the example placement service 260 filters out the first cloud zone. Control then returns to block 726 at which the placement service 260 selects the next highest ordered cloud zone for placement selection. When the flavor mapping specifies a vSphere® VM, control proceeds to block 738 at which the example placement service 260 filters the availability zones based on available memory.

At block 740, the example placement service 260 matches a network to resources of the remaining availability zones. For example, the placement service 260 picks hosts, clusters, and/or RPs of the availability zones to match with network interface controllers of the availability zones and then filters the availability zones based on the matches. At block 742, the example placement service 260 filters the availability zones based on datastore available capacity. At block 744, the example placement service 260 filters out availability zones that cannot be used to allocate security groups associated with the VMs of the availability zones.

At block 746, the example placement service 260 detects an availability zone placement policy of the project and/or the deployment. When the availability zone placement policy corresponds to a binpack policy, control proceeds to block 748 at which the placement service 260 orders the availability zones in a list based on memory load. In some examples, the placement service 260 orders the availability zones in descending order with the highest ordered availability zone having the most loaded memory. When the availability zone placement policy corresponds to a spread policy, control proceeds to block 750 at which the placement service 260 orders the availability zones in ascending order based on VM count in the availability zones. When the availability zone placement policy corresponds to an advanced policy, control proceeds to block 752 at which the placement service 260 calls a cloud infrastructure management tool (e.g., vRealize Operations® (vROps)) to order the availability zones. Following completion of blocks 748, 750, or 752 or when the availability zone placement policy corresponds to a default policy, control proceeds to block 754 at which the example placement service 260 places workloads of the deployment at the highest ordered availability zone. Following block 754, the example operations 700 end.

Figure 8:
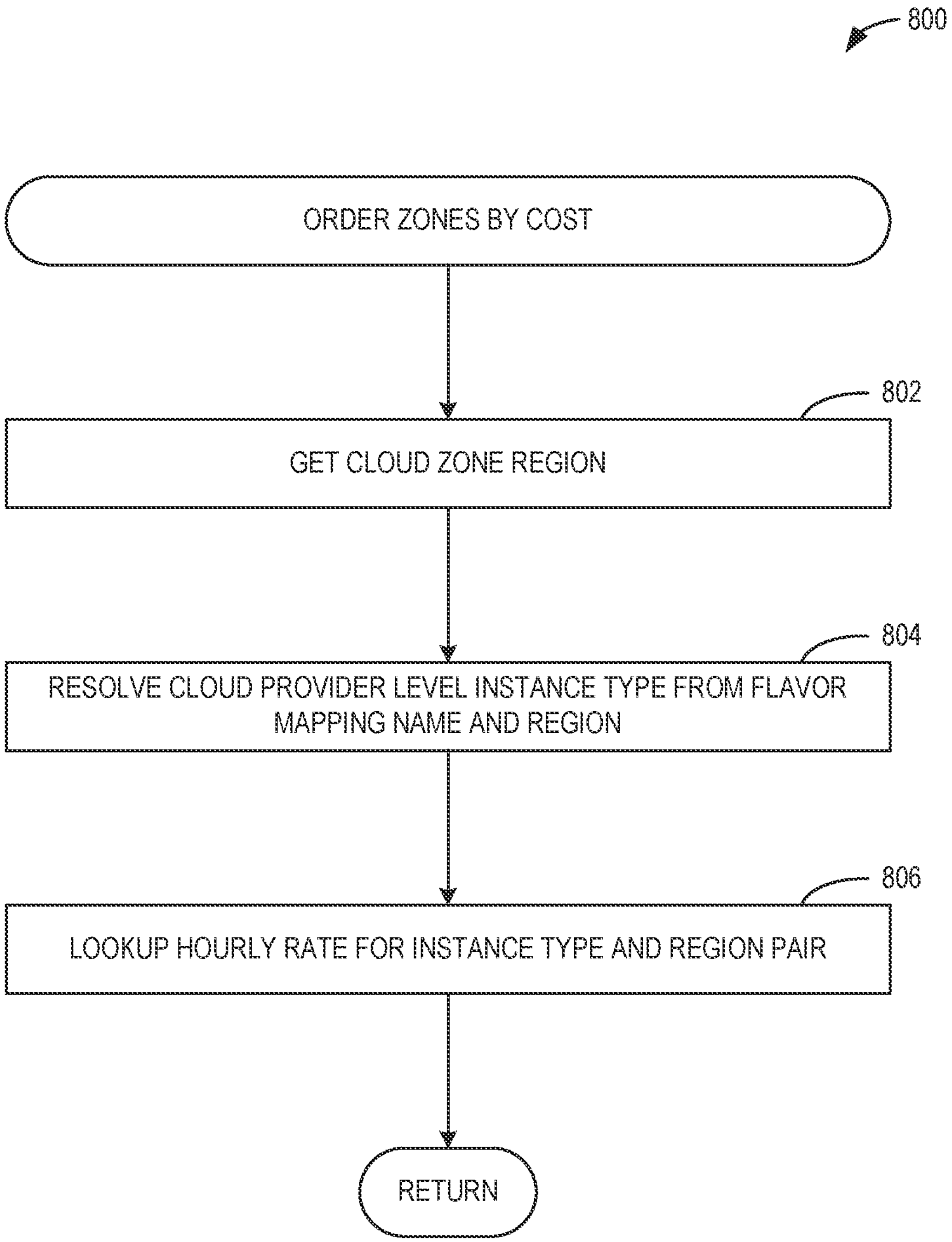

FIG. 8 is a flowchart representative of example machine readable instructions and/or example operations 800 that may be executed, instantiated, and/or performed by programmable circuitry to sort cloud zones based on cost. The example instructions and/or operations 800 of FIG. 8 may be used to implement block 730 described above in connection with FIG. 7. The example machine-readable instructions and/or the example operations 800 of FIG. 8 begin at block 802, at which the example cloud zone service 240 (FIG. 2) gets (e.g., detects, obtains, etc.) the cloud zone region. For example, the cloud zone service 240 looks up the cloud region associated with respective ones of the cloud zones in the deployment list 284 (FIG. 2).

At block 804, the example cloud zone service resolves a cloud provider level instance type from the flavor mapping name and region. For example, the cloud zone service 240 detects or determines the instance types that correspond to the flavor mapping of the template and/or the cloud zones and that is offered by the cloud provider(s) of the cloud zones in the deployment list 284.

At block 806, the example cost service 250 (FIG. 5) looks up the hourly rate for the instance type and cloud region pair. In some examples, the cost service 250 searches instance type hourly rates based on the cloud region(s) (or provider (s)) of the cloud zones and the instance types corresponding to the flavor mapping. The example cost service 250 stores the instance type costs 286 in the memory 282 of FIG. 2. The example cloud zone service 240 orders the cloud zones in the deployment list 284 (FIG. 2) based on the instance type costs 286. Control then returns to block 726 of FIG. 7.

Figure 9:
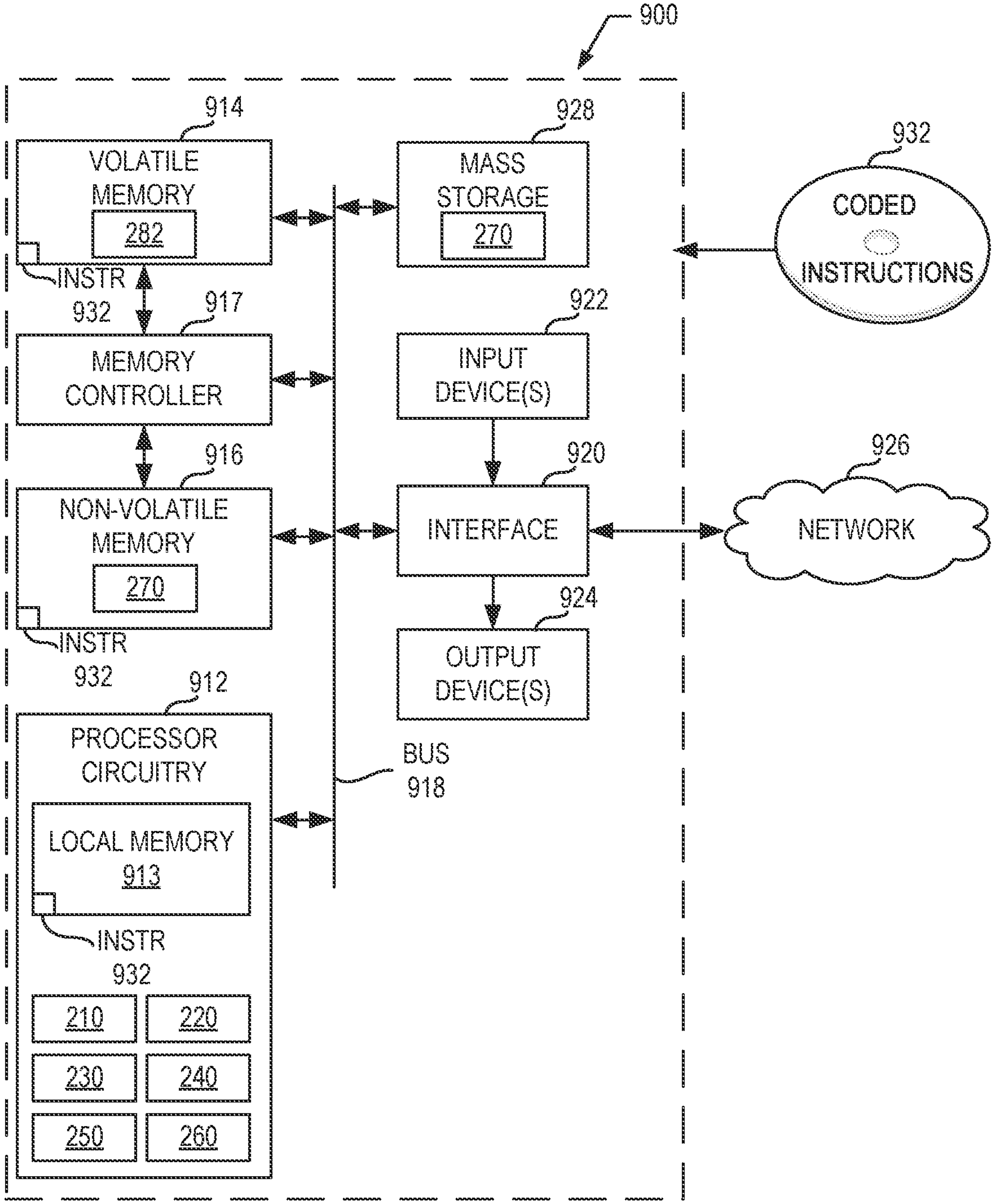
FIG. 9 is a block diagram of an example processing platform including programmable circuitry structured to execute, instantiate, and/or perform the example machine readable instructions and/or perform the example operations of FIGS. 4-8 to implement the cloud automation tool of FIG. 2.

FIG. 9 is a block diagram of an example programmable circuitry platform 900 structured to execute and/or instantiate the example machine-readable instructions and/or the example operations of FIGS. 4-8 to implement the cloud automation tool 110 of FIG. 2. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the example template service 210, the example deployment service 220, the example mapping service 230, the example cloud zone service 240, the example cost service 250, and/or the example placement service 260 of FIG. 2.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 932, which may be implemented by the machine readable instructions of FIGS. 4-8, may be stored in the mass storage device 928, in the volatile memory 914, in the non-volatile memory 916, and/or on at least one non-transitory computer readable storage medium such as a CD or DVD which may be removable.

Figure 10:
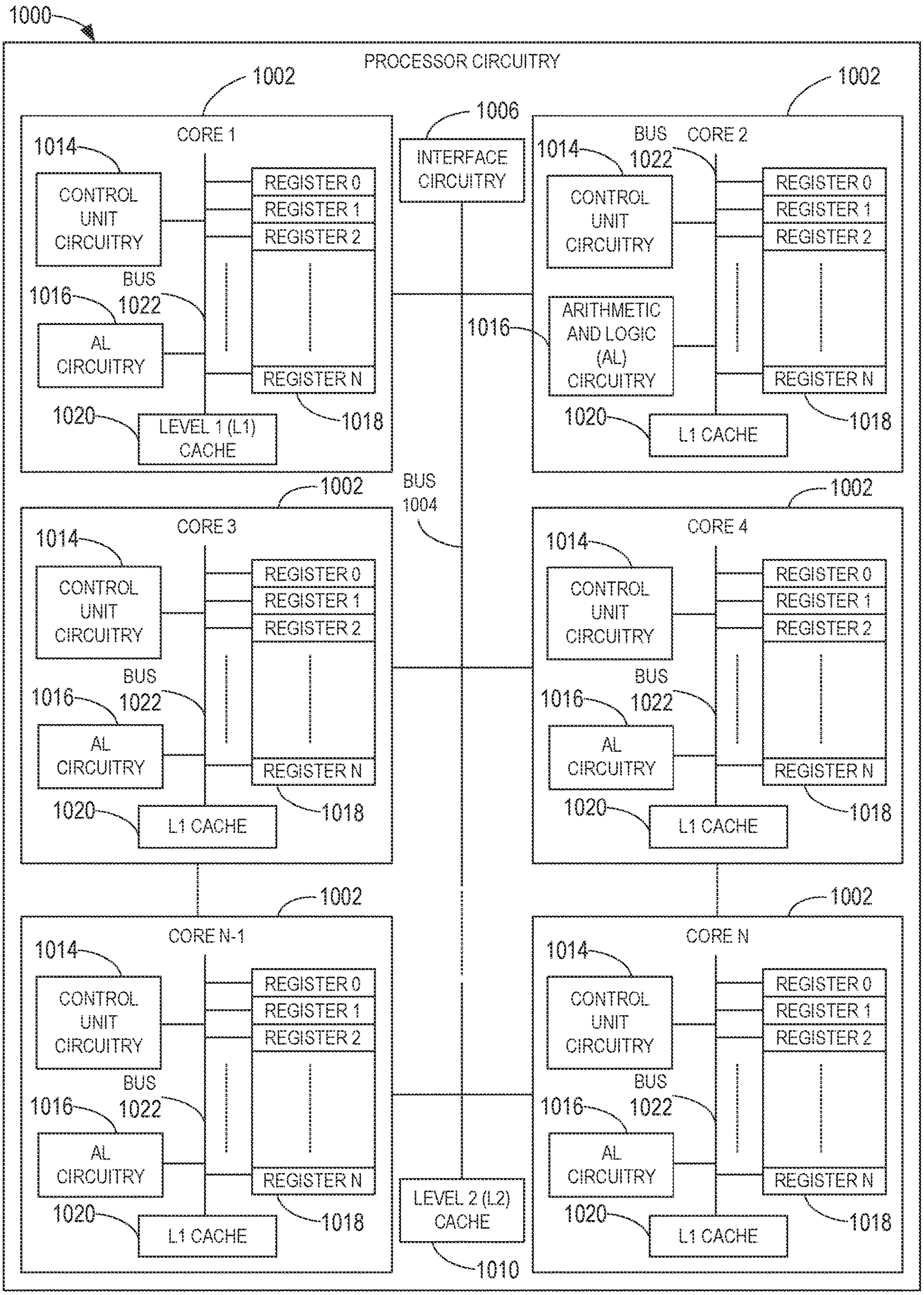
FIG. 10 is a block diagram of an example implementation of the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 4-8 to effectively instantiate the circuitry of FIG. 2 as logic circuits to perform operations corresponding to those machine readable instructions. In some such examples, the circuitry of FIG. cloud automation tool 110 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 4-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
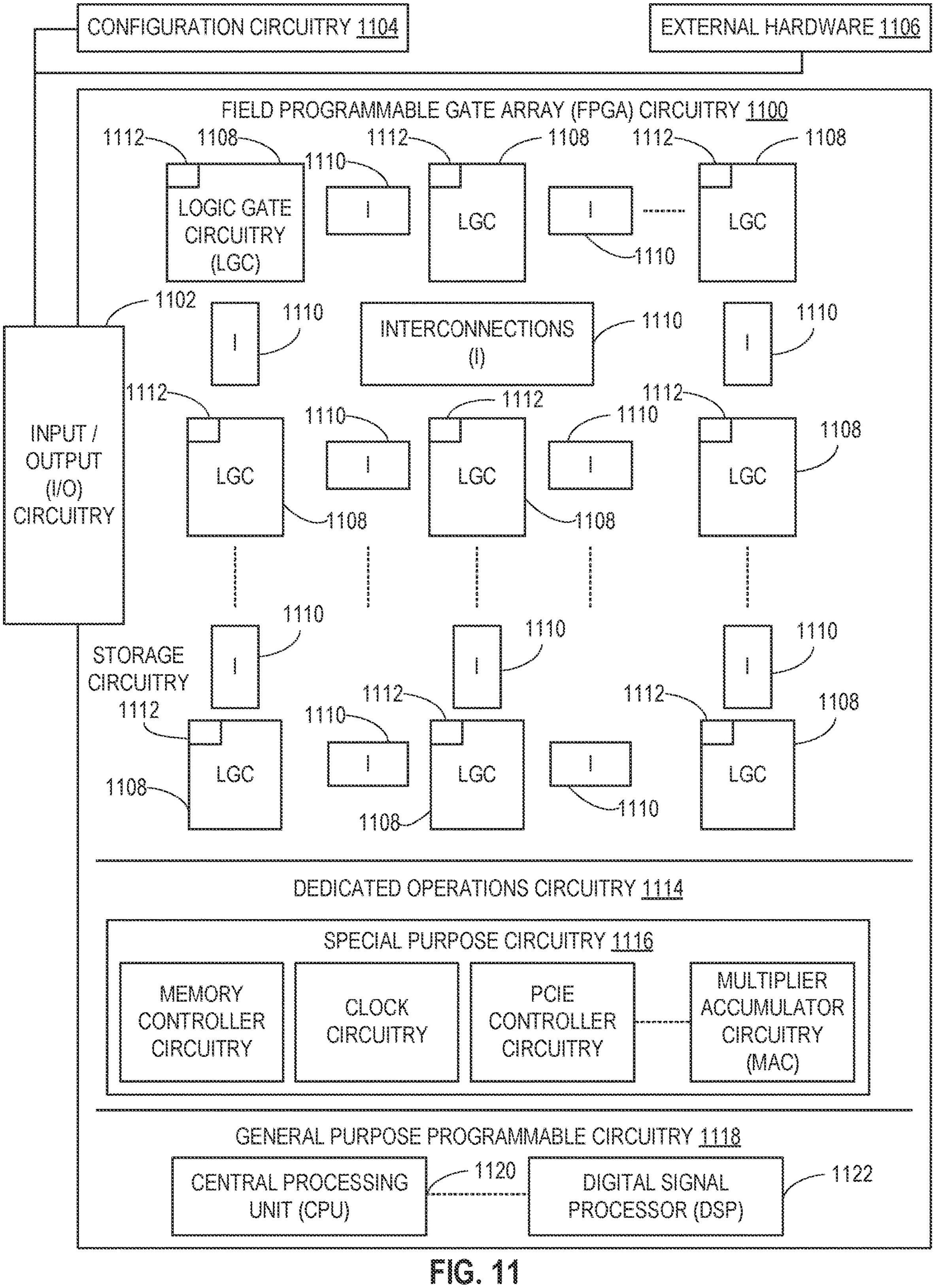
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine readable instructions represented by the flowchart (s) of FIGS. 4-8 but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 4-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4-8. As such, the FPGA circuitry 1100 may be configured and/or structured to effectively instantiate some or all of the operations/functions corresponding to the machine readable instructions of the flowchart(s) of FIGS. 4-8 as dedicated logic circuits to perform the operations/functions corresponding to those software instructions in a dedicated manner analogous to an ASIC. Therefore, the FPGA circuitry 1100 may perform the operations/functions corresponding to the some or all of the machine readable instructions of FIGS. 4-8 faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine readable instructions of FIGS. 4-8 and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 11. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine readable instructions represented by the flowchart (s) of FIGS. 4-8 to perform first operation(s)/function(s), the FPGA circuitry 1100 of FIG. 11 may be configured and/or structured to perform second operation(s)/function(s) corresponding to a second portion of the machine readable instructions represented by the flowcharts of FIG. 4-8, and/or an ASIC may be configured and/or structured to perform third operation(s)/function(s) corresponding to a third portion of the machine readable instructions represented by the flowcharts of FIGS. 4-8.

It should be understood that some or all of the circuitry of FIG. 2 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1000 of FIG. 10 may execute machine readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIG. 2 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package.

Figure 12:
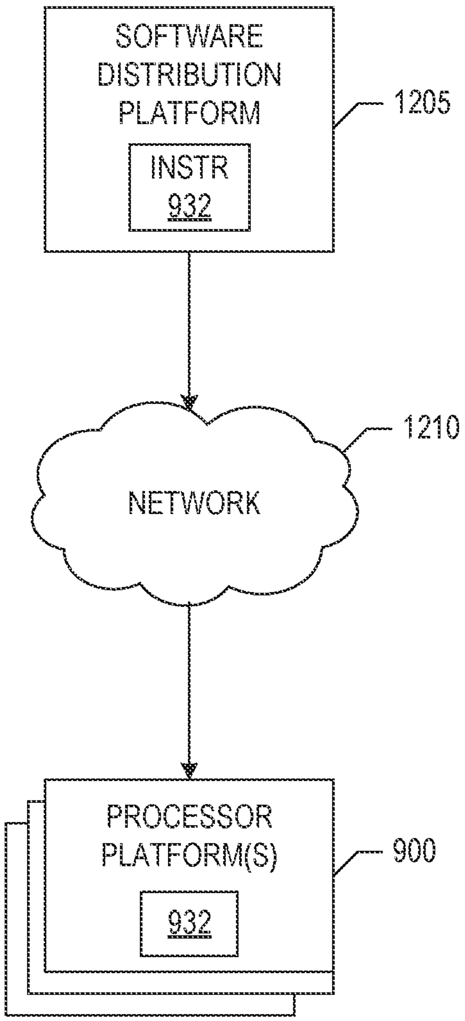
FIG. 12 is a block diagram of an example software/firmware/instructions distribution platform (e.g., one or more servers) to distribute software, instructions, and/or firmware (e.g., corresponding to the example machine readable instructions of FIGS. 4-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to other hardware devices (e.g., hardware devices owned and/ or operated by third parties from the owner and/or operator of the software distribution platform) is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions of FIGS. 4-8, as described above. The one or more servers of the example software distribution platform 1205 are in communication with an example network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions of FIG. 4-6, may be downloaded to the example programmable circuitry platform 900, which is to execute the machine readable instructions 932 to implement the cloud automation tool 110 of FIGS. 1 and 2. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that allocate resources for a cloud deployment based on the costs of the resources. Disclosed systems, apparatus, articles of manufacture, and methods improve the efficiency of using a computing device by automatically sorting cloud zones of a project based on cost and selecting a first cloud zone associated with the lowest cost for deployment using a cloud automation tool rather than relying user interaction. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to deploy cloud templates based on cost are disclosed herein. Further examples and combinations thereof include the following:

Example 1 includes a system to allocate computing resources for a cloud deployment comprising interface circuitry, programmable circuitry, and machine readable instructions to cause the programmable circuitry to obtain a request to deploy a cloud template, sort a plurality of cloud zones in a list based on cost, the plurality of cloud zones being candidates to execute the cloud template, select a first one of the cloud zones in the list based on the first one of the cloud zones corresponding to a first cost that is lower than second costs of other ones of the cloud zones in the list, and deploy the cloud template on one or more instances of the computing resources corresponding to the first one of the cloud zones.

Example 2 includes the system of example 1, wherein the cloud template defines a cloud infrastructure to operate an application of the cloud template.

Example 3 includes the system of example 2, wherein the cloud zones include tags, the tags defining instance types of cloud regions at which the application can be placed.

Example 4 includes the system of example 1, wherein the cloud template is associated with a flavor mapping of the cloud deployment, the programmable circuitry to filter the plurality of cloud zones based on the flavor mapping before sorting the plurality of cloud zones.

Example 5 includes the system of example 4, wherein the programmable circuitry is to detect cloud regions associated with the cloud zones, determine instance types of the cloud regions to use for deployment based on the flavor mapping, look up hourly rates corresponding to the instance types, and sort the plurality of cloud zones in the list based on the cost by sorting the plurality of cloud zones in the list based on the hourly rates.

Example 6 includes the system of example 4, wherein the programmable circuitry is to filter a plurality of availability zones of the first one of the cloud zones based on the flavor mapping, the plurality of availability zones corresponding to the one or more instances of the computing resources.

Example 7 includes the system of example 1, wherein the cloud template is associated with a project including constraints on resources to use for deployment, the programmable circuitry to filter the plurality of cloud zones based on the constraints before sorting the plurality of cloud zones.

Example 8 includes a non-transitory machine readable storage medium comprising instructions to cause programmable circuitry to at least obtain a request to deploy a cloud template, sort a plurality of cloud zones in a list based on cost, the plurality of cloud zones being candidates to execute the cloud template, select a first one of the cloud zones in the list based on the first one of the cloud zones corresponding to a first cost that is lower than second costs of other ones of the cloud zones in the list, and deploy the cloud template on one or more instances of computing resources corresponding to the first one of the cloud zones.

Example 9 includes the non-transitory machine readable storage medium of example 8, wherein the cloud template defines a cloud infrastructure to operate an application of the cloud template.

Example 10 includes the non-transitory machine readable storage medium of example 9, wherein the cloud zones include tags, the tags defining instance types of cloud regions at which the application can be placed.

Example 11 includes the non-transitory machine readable storage medium of example 8, wherein the cloud template is associated with a flavor mapping of a cloud deployment, the programmable circuitry to filter the plurality of cloud zones based on the flavor mapping before sorting the plurality of cloud zones.

Example 12 includes the non-transitory machine readable storage medium of example 11, wherein the instructions are to cause the programmable circuitry to detect cloud regions associated with the cloud zones, determine instance types of the cloud regions to use for the cloud deployment based on the flavor mapping, look up hourly rates corresponding to the instance types, and sort the plurality of cloud zones in the list based on the cost by sorting the plurality of cloud zones in the list based on the hourly rates.

Example 13 includes the non-transitory machine readable storage medium of example 11, wherein the instructions are to cause the programmable circuitry to filter a plurality of availability zones of the first one of the cloud zones based on the flavor mapping, the plurality of availability zones corresponding to the one or more instances of the computing resources.

Example 14 includes the non-transitory machine readable storage medium of example 8, wherein the cloud template is associated with a project including constraints on resources to use for deployment, the instructions to cause the programmable circuitry to filter the plurality of cloud zones based on the constraints before sorting the plurality of cloud zones.

Example 15 includes a method comprising accessing, by executing an instruction with programmable circuitry, a request to deploy a cloud template, sorting, by executing an instruction with the programmable circuitry, a plurality of cloud zones in a list based on cost, the plurality of cloud zones being candidates to execute the cloud template, selecting, by executing an instruction with the programmable circuitry, a first one of the cloud zones in the list based on the first one of the cloud zones corresponding to a first cost that is lower than second costs of other ones of the cloud zones in the list, and deploying, by executing an instruction with the programmable circuitry, the cloud template on one or more instances of computing resources corresponding to the first one of the cloud zones.

Example 16 includes the method of example 15, wherein the cloud template defines a cloud infrastructure to operate an application of the cloud template.

Example 17 includes the method of example 16, wherein the cloud zones include tags, the tags defining instance types of cloud regions at which the application can be placed.

Example 18 includes the method of example 15, wherein the cloud template is associated with a flavor mapping of a cloud deployment, further including filtering the plurality of cloud zones based on the flavor mapping before sorting the plurality of cloud zones.

Example 19 includes the method of example 18, further including, by executing an instruction with the programmable circuitry detecting cloud regions associated with the cloud zones, determining instance types of the cloud regions to use for the cloud deployment based on the flavor mapping, looking up hourly rates corresponding to the instance types, and sorting the plurality of cloud zones in the list based on the cost by sorting the plurality of cloud zones in the list based on the hourly rates.

Example 20 includes the method of example 18, further including, by executing an instruction with the programmable circuitry, filtering a plurality of availability zones of the first one of the cloud zones based on the flavor mapping, the plurality of availability zones corresponding to the one or more instances of the computing resources.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A system to allocate computing resources for a cloud deployment for a user of a cloud service, comprising:

interface circuitry;

programmable circuitry; and machine readable instructions to cause the programmable circuitry to:

obtain a request to deploy a cloud template from the user;

create a plurality of cloud zones, each cloud zone being defined by a mapping that determines which availability zones are included in said each cloud zone, for the user according to requirements defined by the user;

select a first one of the cloud zones based on the first one of the cloud zones corresponding to a first cost that is lower than second costs of other ones of the cloud zones; and deploy the cloud template on one or more instances of the computing resources corresponding to the first one of the cloud zones.

2. The system of claim 1, wherein the cloud template defines a cloud infrastructure to operate an application of the cloud template.

3. The system of claim 2, wherein the cloud zones include tags, the tags defining instance types of cloud regions at which the application can be placed.

4. The system of claim 1, wherein the cloud template is associated with a flavor mapping of the cloud deployment, the programmable circuitry to filter the plurality of cloud zones based on the flavor mapping before sorting the plurality of cloud zones.

5. The system of claim 4, wherein the programmable circuitry is to:

detect cloud regions associated with the cloud zones;

determine instance types of the cloud regions to use for deployment based on the flavor mapping;

look up hourly rates corresponding to the instance types; and sort the plurality of cloud zones based on the hourly rates.

6. The system of claim 4, wherein the programmable circuitry is to filter a plurality of availability zones of the first one of the cloud zones based on the flavor mapping, the plurality of availability zones corresponding to the one or more instances of the computing resources.

7. The system of claim 1, wherein the cloud template is associated with a project including constraints on resources to use for deployment, the programmable circuitry to filter the plurality of cloud zones based on the constraints before sorting the plurality of cloud zones.

8. A non-transitory machine readable storage medium comprising instructions to cause programmable circuitry to at least:

obtain a request to deploy a cloud template from a user of a cloud service;

create a plurality of cloud zones, each cloud zone being defined by a mapping that determines which availability zones are included in said each cloud zone, for the user according to requirements defined by the user;

select a first one of the cloud zones based on the first one of the cloud zones corresponding to a first cost that is lower than second costs of other ones of the cloud zones; and deploy the cloud template on one or more instances of computing resources corresponding to the first one of the cloud zones.

9. The non-transitory machine readable storage medium of claim 8, wherein the cloud template defines a cloud infrastructure to operate an application of the cloud template.

10. The non-transitory machine readable storage medium of claim 9, wherein the cloud zones include tags, the tags defining instance types of cloud regions at which the application can be placed.

11. The non-transitory machine readable storage medium of claim 8, wherein the cloud template is associated with a flavor mapping of a cloud deployment, the programmable circuitry to filter the plurality of cloud zones based on the flavor mapping before sorting the plurality of cloud zones.

12. The non-transitory machine readable storage medium of claim 11, wherein the instructions are to cause the programmable circuitry to:

detect cloud regions associated with the cloud zones;

determine instance types of the cloud regions to use for the cloud deployment based on the flavor mapping;

look up hourly rates corresponding to the instance types; and sort the plurality of cloud zones based on the hourly rates.

13. The non-transitory machine readable storage medium of claim 11, wherein the instructions are to cause the programmable circuitry to filter a plurality of availability zones of the first one of the cloud zones based on the flavor mapping, the plurality of availability zones corresponding to the one or more instances of the computing resources.

14. The non-transitory machine readable storage medium of claim 8, wherein the cloud template is associated with a project including constraints on resources to use for deployment, the instructions to cause the programmable circuitry to filter the plurality of cloud zones based on the constraints before sorting the plurality of cloud zones.

15. A method comprising:

accessing, by executing an instruction with programmable circuitry, a request to deploy a cloud template from a user of a cloud service;

creating, by executing an instruction with the programmable circuitry, a plurality of cloud zones, each cloud zone being defined by a mapping that determines which availability zones are included in said each cloud zone, for the user according to requirements defined by the user;

selecting, by executing an instruction with the programmable circuitry, a first one of the cloud zones based on the first one of the cloud zones corresponding to a first cost that is lower than second costs of other ones of the cloud zones; and deploying, by executing an instruction with the programmable circuitry, the cloud template on one or more instances of computing resources corresponding to the first one of the cloud zones.

16. The method of claim 15, wherein the cloud template defines a cloud infrastructure to operate an application of the cloud template.

17. The method of claim 16, wherein the cloud zones include tags, the tags defining instance types of cloud regions at which the application can be placed.

18. The method of claim 15, wherein the cloud template is associated with a flavor mapping of a cloud deployment, further including filtering the plurality of cloud zones based on the flavor mapping before sorting the plurality of cloud zones.

19. The method of claim 18, further including, by executing an instruction with the programmable circuitry:

detecting cloud regions associated with the cloud zones;

determining instance types of the cloud regions to use for the cloud deployment based on the flavor mapping;

looking up hourly rates corresponding to the instance types; and sorting the plurality of cloud zones based on the hourly rates.

20. The method of claim 18, further including, by executing an instruction with the programmable circuitry, filtering a plurality of availability zones of the first one of the cloud zones based on the flavor mapping, the plurality of availability zones corresponding to the one or more instances of the computing resources.

* * * * *